United States Patent [19]

Fritchen et al.

[11] Patent Number: 4,902,523
[45] Date of Patent: Feb. 20, 1990

[54] APPARATUS AND METHOD FOR PRODUCING A CHEESE PRODUCT

[75] Inventors: Stuart J. Fritchen, Columbus; George H. Hall, Jr., Beaver Dam; Scott C. Ehlenfeldt, Columbus, all of Wis.

[73] Assignee: Stainless Steel Fabricating, Inc., Columbus, Wis.

[21] Appl. No.: 359,248

[22] Filed: May 31, 1989

[51] Int. Cl.$^4$ .................... A23C 19/00; B29F 3/02
[52] U.S. Cl. ............................ 426/231; 99/452; 99/455; 99/535; 425/67; 425/71; 425/142; 425/308; 426/506; 426/517; 426/582
[58] Field of Search ............... 426/231, 582, 506, 516, 426/517, 518; 99/452, 455, 460, 535; 425/67, 71, 142, 306, 308, 316

[56] References Cited

U.S. PATENT DOCUMENTS

| | | | |
|---|---|---|---|
| 2,655,994 | 10/1953 | Vandenberg | 83/72 |
| 2,685,664 | 8/1954 | Visconti | 83/365 |
| 3,128,500 | 4/1964 | Cunningham | 425/142 |
| 3,530,491 | 9/1970 | Rejsa | 425/142 |
| 3,646,894 | 3/1972 | Hasten et al. | 426/518 |
| 3,761,284 | 9/1973 | Foster et al. | 426/516 |
| 3,899,595 | 8/1975 | Stenne | 426/582 |
| 3,966,970 | 6/1976 | Williams | 426/516 |
| 3,969,054 | 7/1976 | Roane | 425/142 |
| 4,068,014 | 1/1978 | Heinbruch | 426/582 |
| 4,288,465 | 9/1981 | Meyer | 426/582 |
| 4,299,855 | 11/1981 | Wada et al. | 426/582 |
| 4,339,468 | 7/1982 | Kielsmeier | 426/582 |
| 4,392,801 | 7/1983 | Meyer | 425/71 |
| 4,492,550 | 1/1985 | Levine | 425/142 |
| 4,568,554 | 2/1986 | Derode | 426/582 |
| 4,626,439 | 12/1986 | Meyer | 426/582 |
| 4,759,704 | 7/1988 | Kraus | 426/516 |

Primary Examiner—George Yeung
Attorney, Agent, or Firm—Quarles & Brady

[57] ABSTRACT

A method and apparatus for producing a cheese product uses an extrusion head having a plurality of extrusion apertures. Cheese is formed into a plurality of continuous ropes as the cheese passes through the extrusion apertures. To initially cool the cheese, each rope enters an extension upstream of each extrusion aperture. Each has an inside diameter equal to the diameter of its associated extrusion aperture. The cheese rope exits the extrusion aperture onto a canal table that is downwardly sloped from a feed end to an opposite discharge end. The canal table has a plurality of flumes extending between the ends, and each extruded rope of cheese is received in a flume. A brine solution is added at the feed end of the canal table to assist in cooling the cheese and moving the cheese to the discharge end. Sensors detect the position of the leading end of the cheese rope within each flume and independently activate knives to cut the cheese into the desired lengths.

13 Claims, 6 Drawing Sheets

APPARATUS AND METHOD FOR PRODUCING A CHEESE PRODUCT

BACKGROUND OF THE INVENTION

The present invention relates to machinery for use in the production of a cheese product. More particularly, it pertains to an apparatus for forming multiple ropes of string cheese and cutting the ropes into individual pieces of an appropriate size for further processing and packaging.

String cheese is produced by extruding cheese into continuous ropes. Most frequently, Italian-type cheeses are used because they naturally possess string-like properties. The ropes are commonly cut into single portions and packaged for consumer consumption. The popularity of such string cheese products has heightened the need for improved methods and machinery to manufacture consumer size portions of string cheese.

For optimal manufacturing efficiency, the extrusion process should simultaneously produce multiple ropes of cheese. This presents some difficulties, however, because current cheese processing equipment is frequently bulky and not well suited to concurrently handling and cutting more than one rope of string cheese. For example, the extrusion of multiple ropes generally requires separate cutting equipment for each rope. When multiple ropes are extruded, their extrusion rates may differ and cutting all the ropes based on the length of any one rope may yield pieces of differing lengths. With multiple ropes, therefore, separate cutting equipment is needed for each rope when a uniform length cheese product is desired. One present device for cutting ropes of cheese uses dual-sided cutting blades which activate after a large counterwheel riding atop the cheese rope has measured the appropriate length. In another design, the appropriate length of cheese is determined by use of a counter weight that pivots when a cheese rope pushes down upon a trip lever. Such systems may pose space and operational difficulties when used in string cheese processing systems that simultaneously produce multiple ropes of cheese.

The shape of the extruded cheese is also an important aspect of producing string cheese products for consumer consumption. The extruded ropes are frequently intended to be round, but handling may flatten the rope and cutting can sometimes distort the shape of the cut end of the rope. For instance, some string cheese cutters cut the rope as soon as the desired length is extruded. In present designs, however, the rope remains formable immediately after extrusion and the cut end of the rope may be deformed from the desired round shape. Thus, present cheese cutting apparatuses may produce products with a deformed shape.

Additionally, present string cheese processing equipment commonly employs a variety of mechanical devices to move the cheese. Some systems use large gripper-type conveyors to transport the cheese to the cutting machinery. In other systems, cut lengths of cheese fall into trays which rock back and forth to dump the cut cheese pieces into vats. For space and economic reasons, it would be advantageous for a multiple rope string cheese processing system to use few such mechanical cheese handling devices.

Thus, it can be seen that an improved apparatus and a method are needed to form multiple ropes of string cheese and cut the ropes into individual pieces of a desired length.

SUMMARY OF THE INVENTION

This invention provides an apparatus and method for producing a cheese product where cheese in a plastic state is entered into an extrusion head having an input end and an opposite output end. The cheese product is forced through a plurality of extrusion apertures at the output end of the head assembly to form a plurality of continuous ropes. The cheese ropes exiting the extrusion apertures are directed onto a feed end of a canal table. Flumes, which extend between the feed end and an opposite discharge end of the canal table, correspond in number and position to the extrusion apertures so that each rope of cheese is received in a flume. A brine solution is added to the flumes adjacent the feed end of the canal table to cool the cheese and assist in moving the advancing rope of cheese toward the discharge end of the canal table. Each flume has a corresponding sensor mounted on the canal table to detect the position of the leading end of the cheese rope on the table. A knife assembly is mounted toward the discharge end of the canal table. Knives corresponding to each flume can be moved between retracted positions and cutting positions to cut the ropes of string cheese. The sensor is operatively connected to the knife assembly so that the knife corresponding to that particular flume cuts the continuous rope of cheese into the desired lengths. Thus, this aspect of the invention advantageously allows continuous ropes of string cheese to be formed, cooled and cut in a relatively small area. This aspect also allows multiple ropes of cheese to be cut independently of one another. In this way, each rope of cheese will be cut into pieces having the same length regardless of varying extrusion rates for different cheese ropes.

In another aspect, the extrusion head includes forming tubes with a constant internal diameter upstream of each extrusion aperture. The cheese flows directly into the forming tubes where the radial periphery of the cheese begins to cool. The cheese rope thus develops a "skin" which conforms in shape and diameter to the forming tubes and the extrusion apertures. This arrangement reduces the deformation of the shape of the cheese rope that may be caused by later processing operations.

In another aspect, the knife is momentarily held in the cutting position after cutting the rope of cheese. By doing this, the brine solution is dammed up within the flume on the feed end side of the knife. When the knife is then moved to its retracted position, the dammed up brine washes the cut portion of cheese product toward the discharge end of the canal table. This eliminates the need for having an additional mechanical device to remove cut lengths of cheese from the canal table.

Thus, it is an object of the present invention to provide an apparatus and method capable of simultaneously processing multiple strands of an extruded cheese into the desired cut length pieces in a space efficient manner.

It is another object of the invention to provide an apparatus that independently cuts each rope of cheese of a multi-rope extrusion in order to insure that the cut pieces are a uniform length regardless of possibly differing rates of extrusion.

It is another object of the invention to provide an apparatus that sets the shape of the cheese rope prior to extrusion so that the product does not develop an undesirable shape during later processing.

It is another object of the invention to reduce the use of separate mechanical devices required to move the rope of cheese along the canal table and away from the cutting area.

The foregoing and other objects and advantages of the invention will be evident from the following description. In the description, reference is made to the accompanying drawings which form a part hereof, and in which there is shown by way of illustration a preferred embodiment of the invention. Such embodiment does not necessarily represent the full scope of the invention. Reference is therefore made to the claims herein for interpreting the scope of the invention.

DETAILED DESCRIPTION OF THE PREFERRED EMBODIMENT

Figure 1:
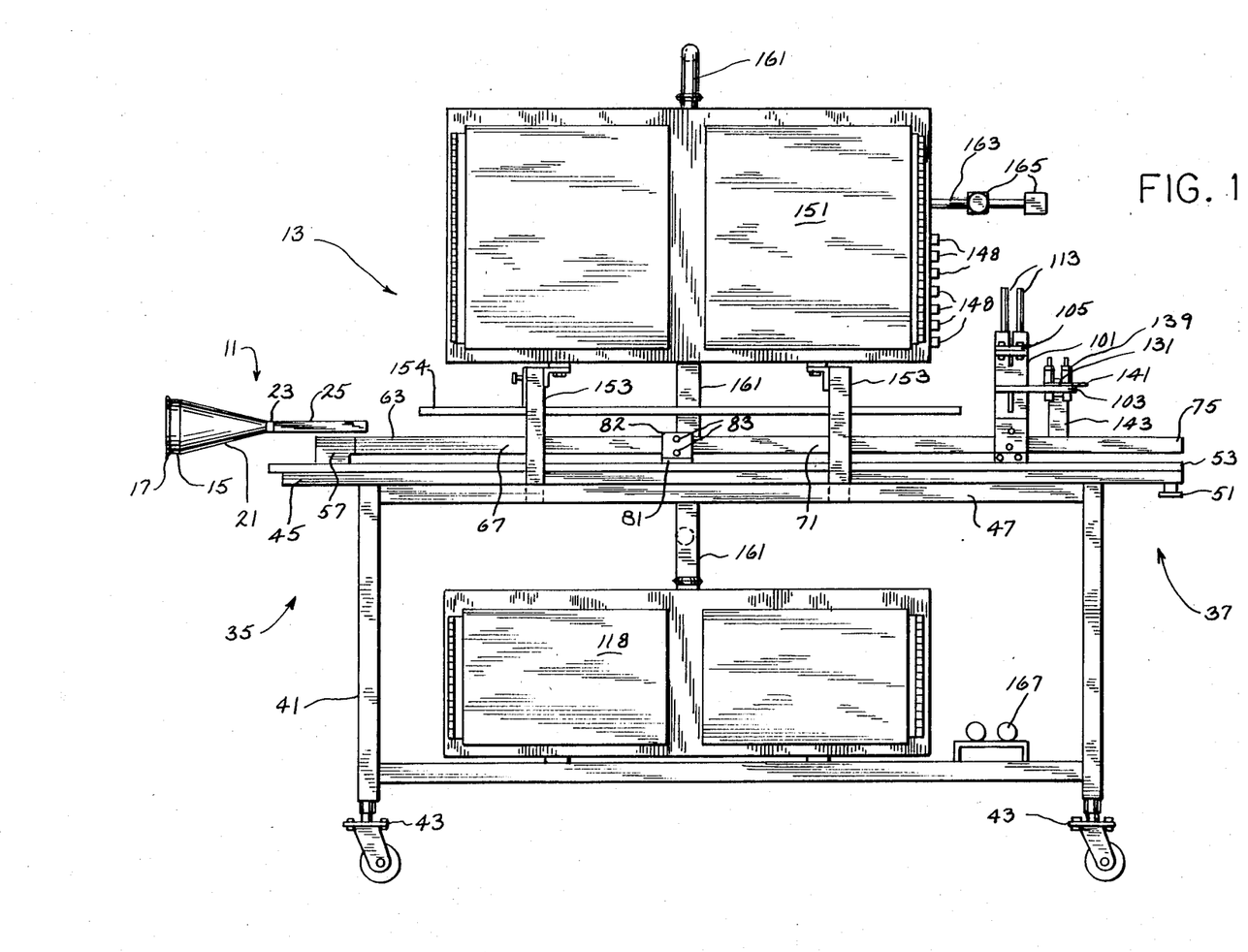
FIG. 1 is a side elevation view of a cheese processing apparatus according to the invention.
Figure 2:
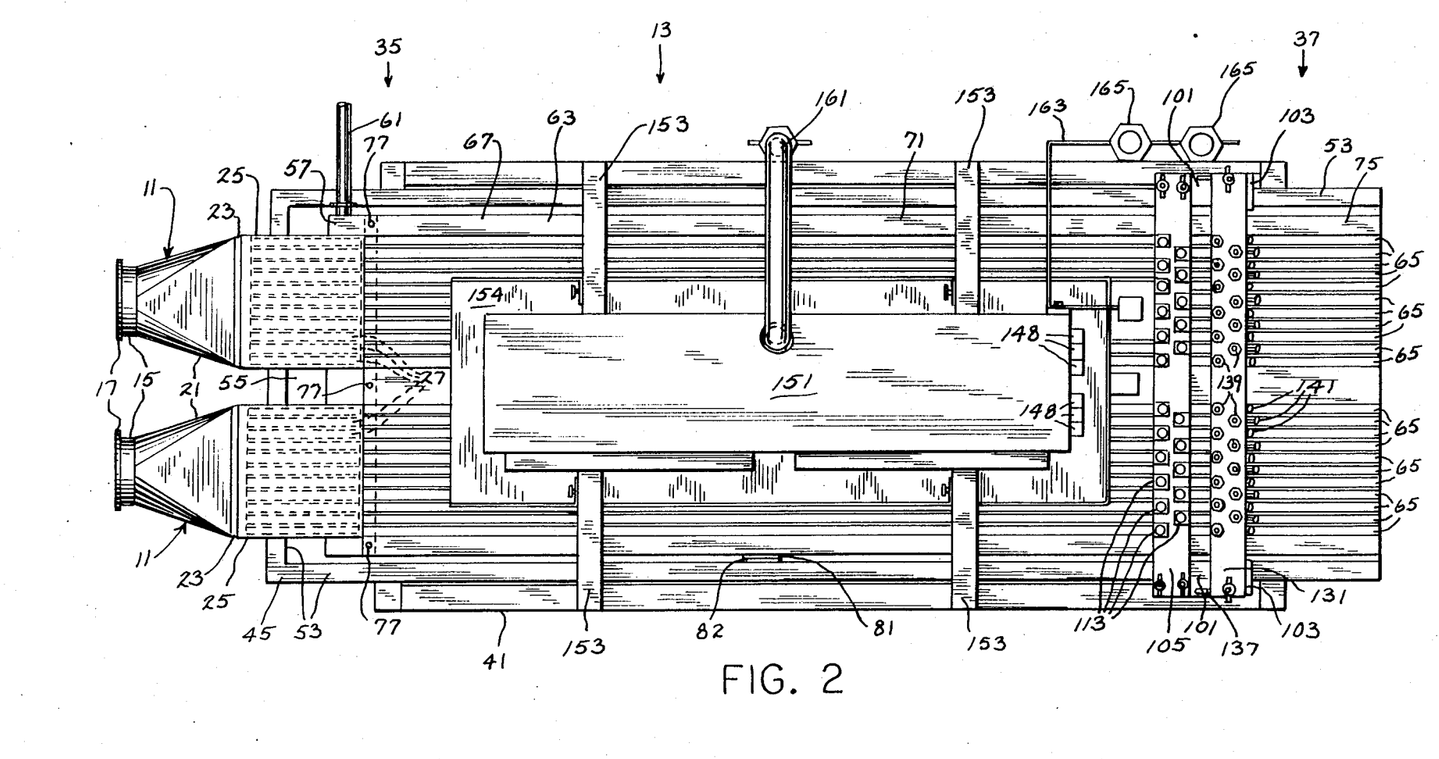
FIG. 2 is a top elevation view of the cheese processing apparatus shown in FIG. 1.

Referring to FIGS. 1 and 2, an apparatus for making a cheese product, such as string cheese, consists of a pair of head assemblies 11 and a processing station 13. Cheese in a plastic state under pressure is introduced into the head assembly 11 by a suitable extruder (not shown), to which the head assemblies are mounted. Both of the head assemblies 11 are shown in FIG. 2. The head assemblies 11 are designed to simultaneously produce continuous, multiple ropes of cheese. The number and size of the ropes are determined by extrusion apertures 33 (FIG. 4) formed in each head assembly 11. The number of extrusion apertures is limited by the capacity of the extruder (not shown) that is connected to each head assembly 11. Head assemblies may have one or more apertures; each head assembly 11 shown in FIGS. 1, 2 and 4 has eleven apertures.

Describing the operation of head assemblies 11, cheese is forced into each head assembly 11 at the end having a ferrule 15. An attachment lip 17 formed integrally with the ferrule 15 is used to connect the head assembly 11 to the extruder. A transition area 21 of the head assembly 11 is welded to the ferrule 15. The transition area 21 is made of sheet metal in a design which reshapes the cheese product from its form as it entered the ferrule 15, to its shape near a forming bar 23. The forming bar 23 contains eleven conical areas (not shown) which each taper to the diameter of the extrusion apertures 33 in the direction of flow. The internal structure of the transition area 21 shapes the mass of cheese entering the area 21 into eleven ropes of the diameter of the aperture 33. The structure of the head assembly from the lip 17 to the forming bar 23 is well known.

Each of the head assemblies 11 also has a stainless steel tube extension unit 25 welded to the forming bar 23. Each extension unit 25 contains eleven forming tubes 27 (FIG. 2) having a constant internal diameter of the diameter of the apertures 33. Thus, there is one tube 27 for each extrusion aperture, and the tube 27 has the same inside diameter as the aperture. The extruded cheese ropes flow directly into the tubes 27 from the forming bar 23.

Figures 4, 5:
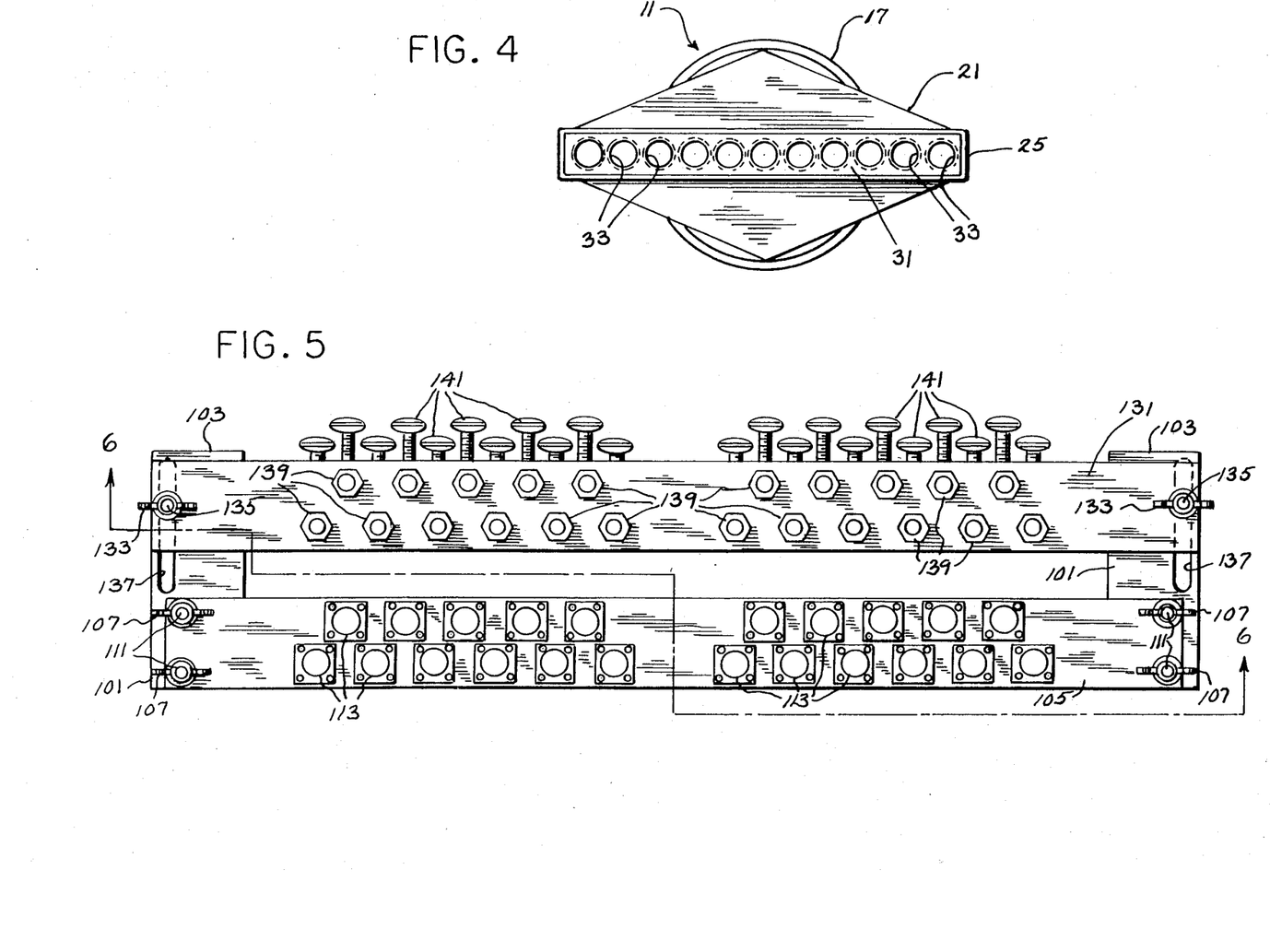
FIG. 4 is an elevation view of an extrusion head and tube extension viewed from the right end as shown in FIGS. 1 and 2.
FIG. 5 is a top elevation view of sensor and knife assemblies which are shown in FIGS. 1, 2 and 3.

The eleven tubes 27 are each welded at one end to the forming bar 23 and at the other end to an end plate 31 (FIG. 4). The apertures 33 are formed in end plate 31 to permit the cheese rope to exit from the tubes 27. Within the tube extension units 25, the tubes 27 are positioned such that an air space surrounds each tube 27 (see FIG. 2). The distance between each aperture 33 in the end plate 31 illustrates the amount of air space surrounding each tube 27. The tubes 27 are made of stainless steel to permit the cheese product to flow through the tube 27 without excessively restricting the flow of the rope of cheese. In the preferred embodiment, the tubes 27 are approximately 11" long and extend into the forming bar by one-half of an inch. The tubes 27 have an inside diameter of 0.68" and are spaced apart from one another by approximately one quarter of an inch (1" measured from the centers of adjacent tubes).

Cheese is extruded at an elevated temperature. As a cheese rope passes through a tube 27, the radial periphery of the cheese rope begins to cool. Heat from the periphery of the cheese is transferred to the tube 27, and then dissipated in the air surrounding the tube 27 and to the exterior portions of the head assembly 11. This initial cooling allows the rope to develop a "skin". The rigidity of the skin depends upon the amount of cooling. In the embodiment illustrated, the tubes 27 are surrounded by a closed air space within each tube extension unit 25. Should greater cooling, and thus a more rigid skin be desired, the tube extension units 25 could be provided with vents to increase the flow of air over the tubes 27. Other methods of cooling the exterior of the tubes 27 could also be used, such as forcing air past the tubes or surrounding the tubes in a closed or flowing liquid bath.

The skin of the rope conforms in shape and diameter to that of the extrusion apertures and the tubes 27. The skin develops when the cheese is still being contained in the circular environment of the tube 27. The skin thus takes the circular shape and aids in preventing the rope from deforming into an oval shape when the rope exits the head assembly 11. The skin also helps set the diameter of the rope. The skin forms according to the diameter of the tube 27, and the skin aids in controlling the expansion of the diameter of the rope when the rope exits the tube 27. The ropes exit the tubes 27 through the end plate 31 of the tube extension 25 and fall under the force of gravity to the processing station 13.

In present cheese making operations, extruded cheese is often allowed to fall freely to a processing area immediately upon leaving the forming bar 23; no tube extension 25 is used. The cheese naturally curves downward due to the force of gravity. By using the tube extension units 25, however, the cheese is forced to continue in a straight path after exiting the forming bar 23. It has been discovered that this greatly enhances the rate of flow of the rope of cheese without increasing the driving speed or force of the extruder. It appears that allowing the cheese to fall naturally upon exiting the head assembly creates a substantial amount of restriction in the area around the extrusion aperture. Use of the tube extension units 25 reduces this restriction, and increases the flow rate of the cheese for the same power input to the extruder.

It has been found that the length of the tube 27 affects the amount of resistance to the flow of the rope of cheese. The tube extension 25 shown in FIGS. 1 and 2 uses tubes 27 that are approximately 11" in length and 0.68" in internal diameter as previously discussed. The best tube length may be a function of the desired diameter of the tube (and therefor also of the extrusion aperture). When the tube length was increased more than a couple of inches over the 11", the flow of the cheese rope was restricted. Similarly, when the tube length was decreased more than a couple of inches, the rope was not properly formed and the flow of the rope was again restricted.

The processing station 13 receives the rope of cheese from the head assembly 11. The function of the processing station 13 is to further cool the cheese, subject the cheese to a cooling brine solution (not shown) in order to stop bacteria growth, and cut the rope of cheese into the desired length. The rope of cheese is received at a feed end 35 of the processing station 13 and the cut lengths of cheese are removed at a discharge end 37 (see FIG. 3) of the processing station 13. The processing station 13 has a cart 41 mounted for convenience on wheel assemblies 43. In this way, the station 13 can be positioned appropriately with respect to the head assembly 11 to receive the rope of cheese as described below. When the processing station 13 is being cleaned or is not in use, the wheel assemblies 43 allow the cart 41 to be conveniently located remote from the head assembly 11 and the cheese-making equipment.

A cutter pan 45 is fastened to a top portion 47 of the cart 41. The cutter pan 45 is designed to slope in the direction of a drain 51 (FIG. 1), i.e., from the feed end 35 to the discharge end 37. The cutter pan 45 has retaining walls 53 which surround a floor surface 55. The purpose of the cutter pan 45 is to catch and remove any of the brine solution which falls onto the pan 45. Should brine spill, it would move by gravity to the drain 51 (FIG. 1) at the discharge end 37 of the cutter pan 45 and enter a brine waste tank or brine recirculation system (not shown).

A brine diffuser 57 is positioned on the floor 55 of the cutter pan 45 near the feed end 35 of the station 13. The brine solution is input to the diffuser 57 by means of a brine input tube 61 (FIG. 2) which can be connected to a brine tank (not shown) or to a brine circulation system. One side of the brine diffuser 57 is flush with a canal table 63. The canal table 63 has two sets of eleven flumes 65 (FIG. 2) extending from the feed end 35 to the discharge end 37. Like the cutter pan 45, the canal table 63 is downwardly sloped from the feed end 35 to the discharge end 37. Three walls of the brine diffuser 57 extend upward to the level of the top of the canal table 63. A fourth wall, which confronts the canal table 63, is lower than the other three and allows brine to flow into each of the flumes 65 at an approximately equal rate. The flow rate of brine in the flumes 65 can be adjusted by controlling the rate of flow of brine entering the diffuser 57 from the brine tube 61.

The flow of the brine solution in the flumes 65 accomplishes several functions. First, the brine aids in moving the cheese rope along the canal table 63. The density of the brine solution can be established to partially float the rope within the flume 65. Also, the brine flow rate can be adjusted to help move the rope because the greater the brine flow rate, the more the rope is urged along the flume 65. Second, brining stops bacteria growth and may flavor the cheese product. And third, the brine further cools the cheese to set the shape of the cheese rope prior to cutting and additional processing. The proper brine density and acidity, and the proper amount of additives, are for the cheese-maker to decide based on the desired characteristics of the cheese product.

The canal table 63 is comprised of four section: a feed end section 67, a middle section 71, a knife guide section 73, and a discharge end section 75. All of the sections 67, 71, 73 and 75 are elevated above the cutter pan 45. Each section is formed with the flumes 65 so that the flumes run continuously from the feed end 35 to the discharge end 37 of the table 63. It should be noted that the canal table 63 could be formed in fewer sections or in a single piece, if desired. Four sections were chosen in the illustrated embodiment based on production constraints. Also, the canal table 63 has been constructed of a homopolymer plastic with the trade name Delrin by E. I. DuPont, and of a copolymer with the trade name Celcon by the Celanese Chemical Company, both plastics having similar properties. Other suitable materials, such as a molded fiberglass, formed or machined stainless steel, etc., may be substituted.

The feed end section 67 is fastened to the diffuser 57 by suitable pins 77 (FIG. 2) to form a fluid tight connection therebetween. The feed end section 67 is joined with the middle section 71 by a connection assembly 81. The connection assembly 81 has a pair of bars (not shown) running beneath the canal table 63 adjacent the joint between the feed end section 67 and the middle section 71 to support those sections. The connection assembly 81 is connected to the sides of the canal table sections 67 and 71 by pins (not shown). A side cover 82 attaches to the connection assembly 81 by bolts 83 (FIG. 1). The connection assembly 81 has legs (not shown) extending downward to the cutter pan 45 to suspend the canal table 63 above cutter pan 45.

Figure 3:
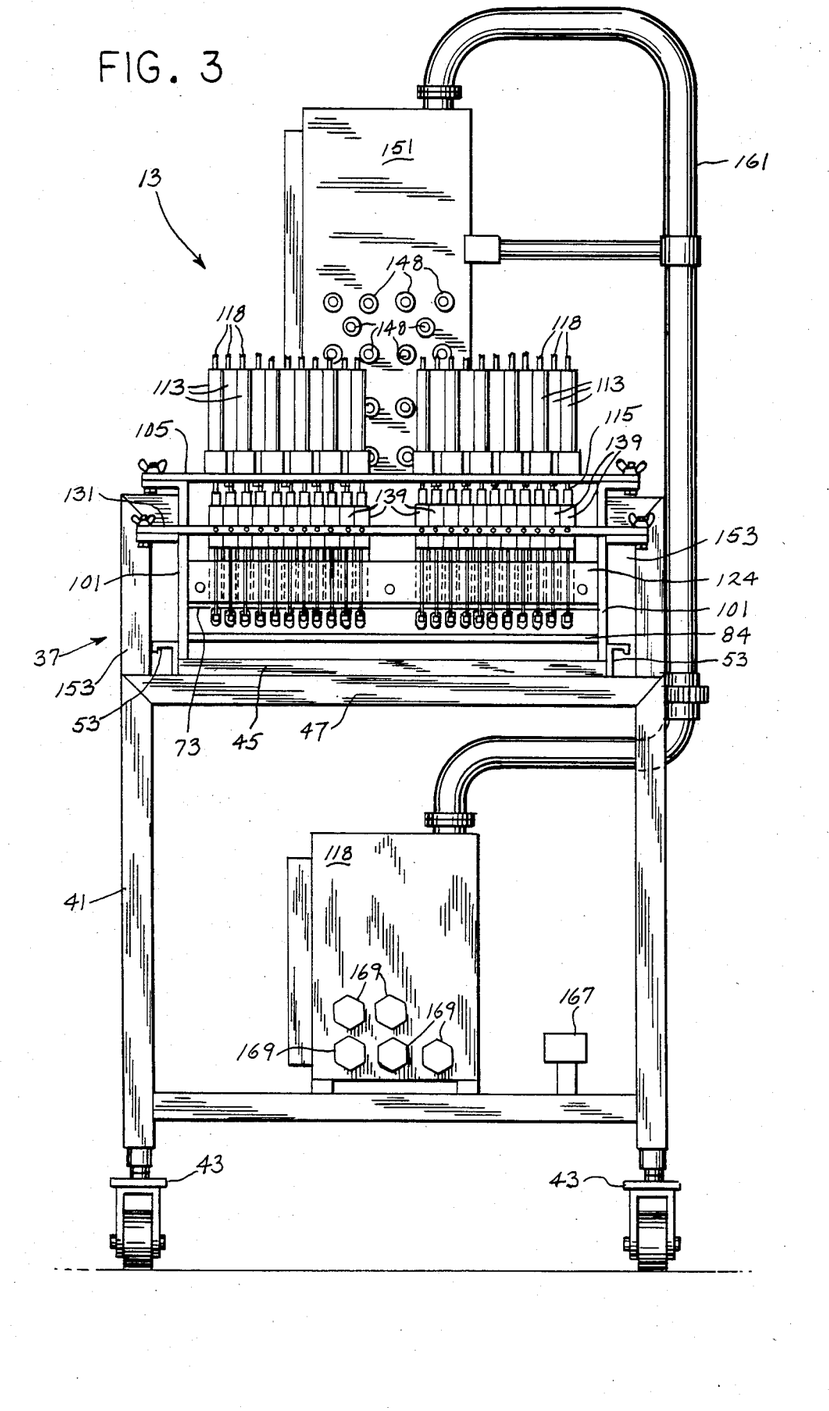
FIG. 3 is an end elevation view of the cheese processing appartus shown in FIGS. 1 and 2.
Figure 6:
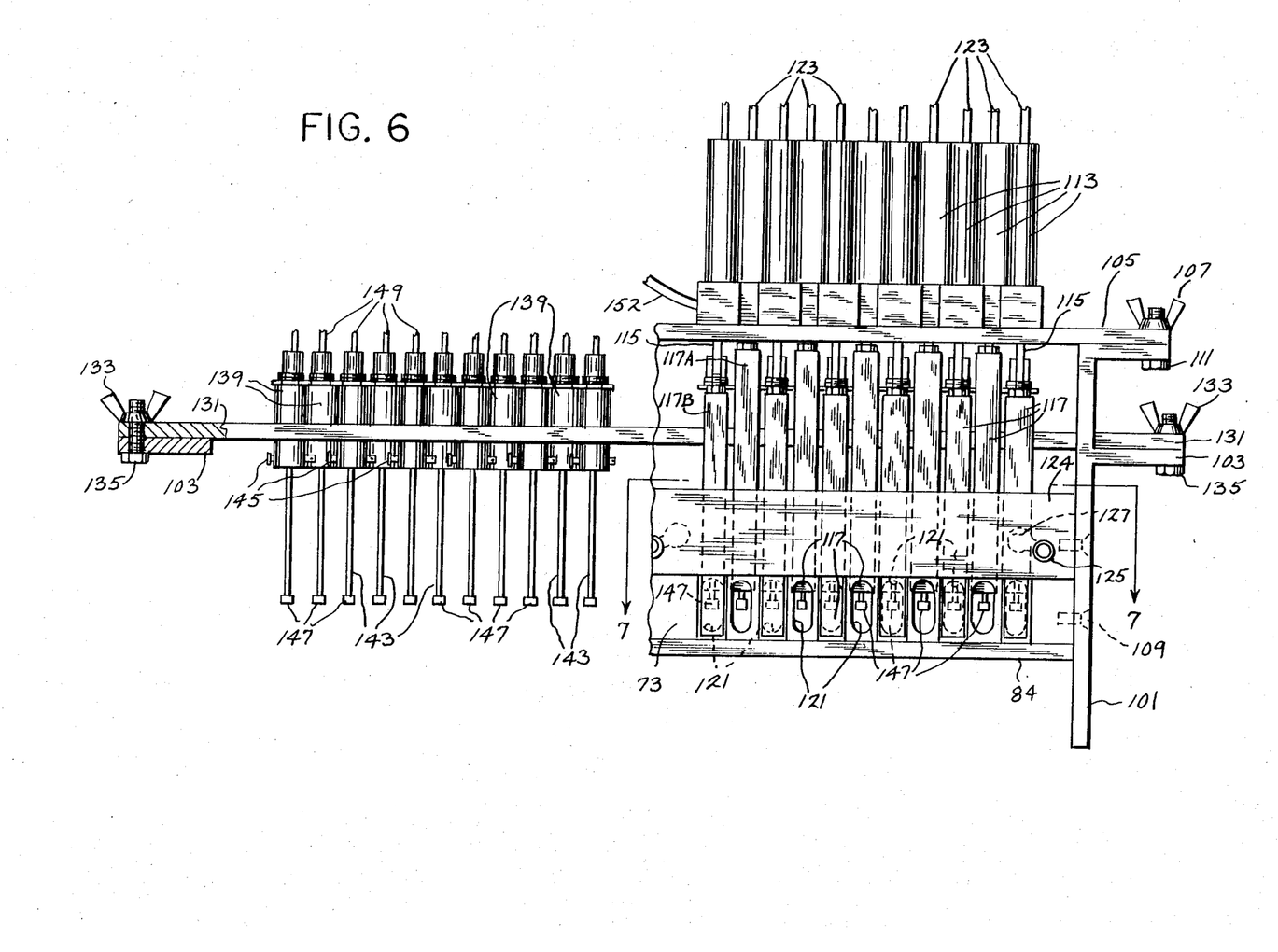
FIG. 6 is a sectional view taken from the plane of the line 6—6 of FIG. 5.

The knife guide section 73 is positioned between the middle section 71 and the discharge end section 75 and mounted on a support bar 84 (FIGS. 3 and 6). Viewing FIG. 7, the middle section 71 abuts the knife section 73 at reference numeral 85. It can be seen that the flumes 65 are spaced apart by lands 87. Alternate flumes 65 of the discharge end of the middle section 71 are formed with outwardly projecting tongues 91. These tongues 91 mate with grooves 93 formed in the knife guide section 73. Correspondingly, the discharge end section 75 has alternate projecting tongues 95 which mate with grooves 97 in the knife guide section. This pattern of tongues 91 and 95 and grooves 93 and 97 establishes a fitted connection between the middle, knife guide, and discharge sections 71, 73, and 75.

The middle, knife guide, and discharge end sections 71, 73, and 75 are attached to support brackets 101 (FIGS. 1–3 and 5–7) by pins 109. The support brackets 101 are positioned on opposite sides of the canal table 63 and extend downward to rest on the cutter pan 45. The brackets 101 are shaped with an F-shaped profile (FIG. 6) and an extension arm 103 (FIGS. 1, 2, 5 and 6) directed toward the discharge end 37 of the canal table 63. As shown in FIG. 1, the discharge end 37 of the discharge section 75 is suspended above the cutter pan 45. To provide additional support, braces (not shown) may be provided between the discharge section 75 and the cutter pan 45. The discharge section 75 overhangs the cutter pan 45 slightly in order for the brine and cheese product from the canal table 63 to fall to a receiving tank (not shown).

Thus, the sections of the canal table 63 align so as to form two groups of eleven flumes 65 each of which is aligned with an aperture 33 of the head assemblies 11. Brine entering the flumes 65 at the feed end 60 of the table 63 flows within the flumes 65 to the discharge end 37 because the canal table 63 is sloped in that direction. The ropes of cheese exit the head assemblies 11 and fall (see FIG. 1) onto the canal table 63. Due to the proper positioning of the processing station 13 with respect to the head assembly 11, each extruded rope of cheese falls into its corresponding flume 65 (see FIG. 2). The rope travels along the flume 65 with the brine aiding in its movement and also cooling the rope in preparation for cutting.

A knife support plate 105 is mounted between the support brackets 101 by wingnuts 107 and bolts 111. The support plate 105 carries twenty-two pneumatic cylinders 113, one aligned with each flume 65. In this design, the cylinders 113 are arranged in a staggered relationship (see FIG. 5) to conserve space. Each cylinder 113 controls a piston rod 115 (FIG. 6) extending down beneath the knife support plate 105. The rods 115 extend through apertures (not shown) in the knife support plate 105 and knives 117 are fixed to the ends of the rods 115 to move vertically therewith. The position of each knife 117 is thus controlled by the corrsponding pneumatic cylinder 113. A hose 123 and a hose 152 for each cylinder 113 (only one hose 152 is shown in FIG. 6, it being understood that each cylinder 113 would have a hose 152) connect the cylinders 113 to a pneumatic control box 118 (connections to box not shown). The hoses 123 and 152 are strung through eyelets 165 attached to support arm 163 (FIG. 9) and through guides 167 (FIGS. 1 and 3). The hoses 123 and 152 then attach to connectors 169 on pneumatic control box 118. The operation of pneumatic cylinders is generally well known. In this particular application, the pneumatic control box 118 directs a compressed air flow through the hoses 123 and 152, causing the cylinders 113 to move the rods 115. The rods 115, and therefore the attached knives 117, are capable of moving between a retracted position illustrated by the position of the knife labeled 117A in FIG. 6 and a cutting position illustrated by the position of the knife labeled 117B.

Figure 7:
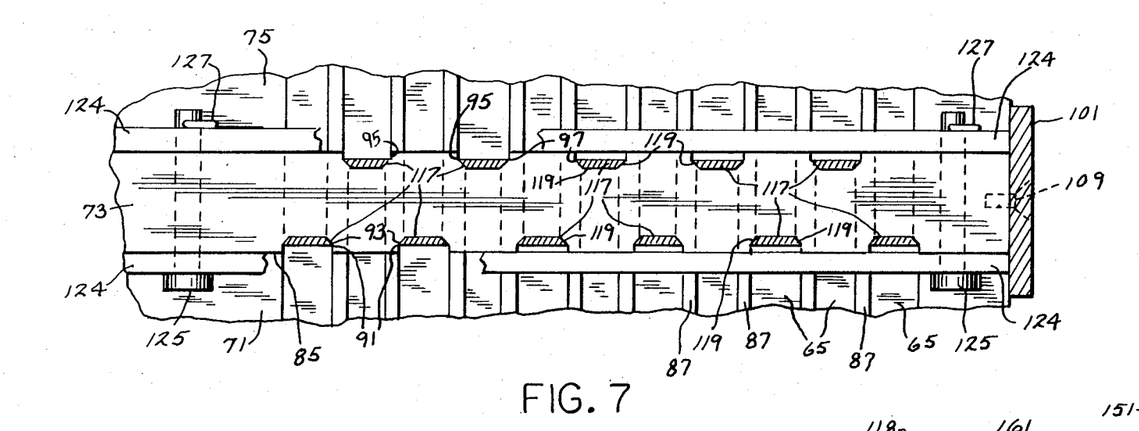
FIG. 7 is a sectional view taken from the plane of the line 7—7 of FIG. 6.

The knives 117 are guided in their movement by the knife guide section 73 of the canal table 63. Viewing FIG. 7, it can be seen that the knives 117 fit in grooves 119 formed between the knife guide section 73 and both the middle section 71 and the discharge end section 75. Each groove 119 extends between the lands 87 and is aligned with a flume 65. Viewing FIG. 6, it can be seen that the knife guide section 73 has oblong holes 121 that correspond in shape and location to the flumes 65. The bottom of the holes 121 are the same height as the bottom of the flumes 65 so as to maintain a generally continuous fiber surface over the entire canal table 63. The knives 117 are also guided by a pair of cover plates 124 (FIGS. 3, 6 and 7). The cover plates 124 are connected to each side of the knife guide section 73 by pins 125 and keys 127. The cover plates 124 maintain the knives 117 against the knife guide section 73.

A sensor support plate 131 is mounted on the extension arms 103 of the support brackets 101. The sensor support plate 131 spans the canal table 63 and is attached to the extension arms 103 by wingnuts 133 and bolts 135. The extension arms 103 have elongated positioning slots 137 (FIG. 2 and 5) through which the bolts 135 are inserted. The positioning slots 137 allow the sensor support plate 131 to be positioned in a range of longitudinal locations defined by the positioning slots 137.

Sensors 139 are mounted through openings (not shown) in the sensor support plate 131. Thumbscrews 141 maintain the sensor 139 within the opening and allow the height of the sensor 139 to be adjusted. Twenty-two sensors 139 are shown, one corresponding to each flume 65 and knife 117 combination. Thus, for each flume 65, there is one corresponding knife 117 and one coresponding sensor 139. The sensors 139 are staggered on the sensor support plate 131 in the same manner that the pneumatic cylinders 113 are mounted on the knife support plate 105. In this way, each sensor 139 is equidistant from its respective knife 117.

Figure 8:
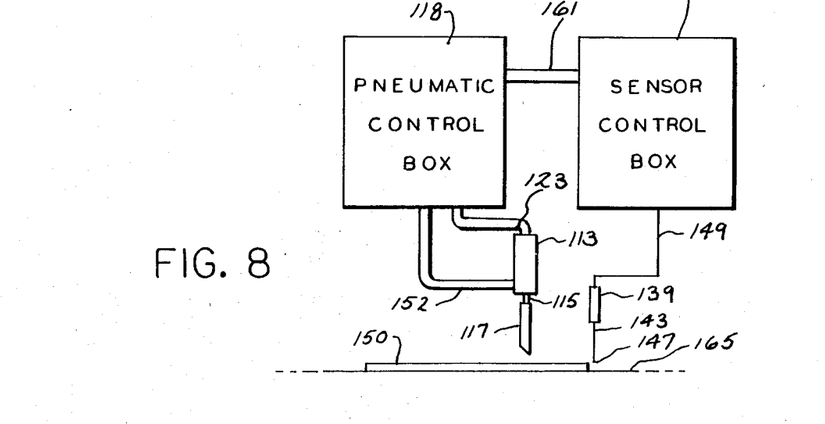
FIG. 8 is a schematic view of a control system for a cheese processing apparatus of the invention.

Levers 143 are pivotally attached to the sensors 139 by pins 145. Each lever 143 extends downward toward the canal table 63 and terminates in a head 147. The heads 147 are located with respect to the flumes 65 so that the ropes of cheese contact the heads 147 when the ropes reach the position on the canal table 63 beneath the corresponding sensor 139. As the cheese rope pushes on the lever head 147, the lever 143 pivots about an axis passing through the pin 145. The sensor is an off-the-shelf inductive proximity sensor which is activated by the pivoting motion of the lever 143. The output of the sensor 139 is transmitted via wires 149 (FIG. 6) attached to connectors 148 (FIGS. 1, 2 and 3) on a sensor control box 151. The sensor control box 151 is mounted on braces 153 attached to the cart 41 and is separated from the canal table 63 by a plate 154 (FIGS. 1 and 2). The sensor signal is used to actuate appropriate electrical and pneumatic circuitry which causes the corresponding knife 117 to be actuated Referring to the schematic view of FIG. 8, each rope 150 of cheese moves down the canal table 63 in its corresponding flume 65. When the leading end of the rope 150 reaches head 147 and causes lever 143 to pivot, the sensor 139 transmits an electrical signal via wire 149 to the sensor control box 151. The sensor control box may contain a microcomputer, relay controls or other suitable controls and electrical interfaces to process the sensor signal into an electrical signal for actuating a pneumatic solenoid valve (not shown) in the pneumatic control box 118 which is associated with the particular sensor 139 and corresponding pneumatic cylinder 113. Signals are transmitted between the pneumatic control box 118 and the sensor control box 151 over wires (not shown) contained in tube 161. There is one solenoid valve in the pneumatic control box 118 for each flume 65. It should also be understood that compressed air is introduced to the pneumatic control box 118, as is electrical power introduced to the sensor control box 151 by external sources.

The solenoid valve is plumbed so as to simultaneously introduce compressed air to line 123 and relieve compressed air from line 152 upon actuation. This extends piston rod 115 to move knife 117 into the cutting position 117B thereby cutting off the cheese piece. De-energizing the solenoid valve vents line 123 to exhaust and pressurizes line 152 to retract knife 117 from the cutting position and into the retracted position 117A.

It is desirable to hold knife 117 in the cutting position 117B a sufficient length of time to dam up brine upstream of the knife. Upon retracting the knife 117 to the retracted position 117A, the dammed up brine is released to flush the cut cheese piece away from the sensor 139 and past the end of the flume 65 out of the canal table 63. Alternatively, the brine flow rate through each flume 65 could be increased until it is sufficient to wash the cut cheese piece past the sensor 139 without any significant "damming up" required to ready the sensor for the next cutting operation.

It should be noted that all of the knives 117 act independently of one another. Thus, the lengths of the cut cheese pieces are uniform and do not depend upon variation in the extrusion rates of different cheese ropes.

The foregoing detailed description has been for the purpose of illustration. Thus, a number of modifications and changes may be made without departing from the spirit and scope of the present invention. For example, the head assembly 11 could be made to produce a different number of ropes of cheese. This would require similar modifications to the canal table 63, knives 117 and sensor 139. Likewise, the brine could be entered into the flumes 63 by some other method than the diffuser 57. Therefore, the invention should not be limited by the specific embodiments described, but only by the claims.

We claim:

1. An apparatus for producing a cheese product, comprising:
    an extrusion head for extruding cheese, said extrusion head having an input end and an opposite output end, said output end having a plurality of extrusion apertures which form said cheese into a plurality of ropes when said cheese is expelled through said extrusion apertures;
    a canal table having a feed end and an opposite discharge end with a plurality of flumes extending between said feed and discharge ends, said canal table being positioned adjacent said extrusion head such that said cheese ropes exiting said extrusion apertures are individually received into said flumes;
    means for adding a brine solution into said flumes adjacent said feed end for flowing the cheese ropes down their associated flumes in the direction from the feed end to the discharge end of the canal table;
    means associated with each flume and attached to said canal table between said feed and discharge ends for sensing the presence of the leading end of the cheese rope in the flume; and
    means associated with each flume and attached to said canal table upstream of the sensing means for cutting a cheese rope in the associated flume in response to the sensing by the corresponding sensing means of the leading end of the cheese rope in the associated flume.

2. An apparatus as in claim 1, wherein said extrusion head includes an extension of a constant internal diameter upstream of each extrusion aperture.

3. The apparatus of claim 1, wherein said cutting means includes a plurality of knives, each knife having a cutting position within said flume to cut the cheese rope and also having a retracted position remote from said flume to allow the cheese rope to flow past said knife.

4. The apparatus of claim 3, wherein said knife is temporarily held in said cutting position to dam the flow of said brine solution.

5. The apparatus of claim 1, wherein said sensor is an inductive proximity sensor having a lever which pivots in response to contact with the cheese rope.

6. The apparatus of claim 1, wherein said canal table is downwardly sloped from said feed end to said discharge end.

7. The apparatus of claim 6, wherein said brine adding means is a diffuser pan positioned adjacent said feed end of said canal table, said diffuser pan adapted to receive said brine solution and to permit said brine solution to flow into each flume of said canal table.

8. A method for producing a cheese product, comprising the steps of:
    extruding cheese through a plurality of extrusion apertures to form the cheese into a plurality of ropes;
    forcing each cheese rope through one of a plurality of extensions of a constant internal diameter to begin to cool the cheese, said extensions being upstream of and connected to each extrusion aperture;
    guiding the ropes of cheese onto a canal table having a feed end and an opposite discharge end with a plurality of flumes extending between said feed and discharge ends, said canal table being positioned such that the cheese ropes exiting said extrusion apertures are individually received into said flumes;
    channeling a brine solution into said flumes to further cool the cheese ropes and to aid in moving the cheese ropes along said flumes;
    sensing the presence of the leading end of each cheese rope in said flumes; and
    cutting a predetermined length of each cheese rope based on the sensed presence of the leading end of each cheese rope within each flume.

9. The method of claim 8, wherein said constant internal diameter of said extension is equal to the diameter of said extrusion aperture to which said extension is connected.

10. The method of claim 8, wherein said canal table is downwardly sloped from said feed end to said discharge end.

11. The method of claim 10, wherein said brine is added to a diffuser pan positioned adjacent said feed end of said canal table, and said diffuser pan receives said brine solution and permits said brine solution to flow into each flume of said canal table.

12. The method of claim 8, wherein said cutting is done by a plurality of knives, each knife having a cutting position within said flume to cut the cheese rope and also having a retracted position remote from said flume to allow the cheese rope to flow past said knife.

13. The method of claim 12, wherein said knife is temporarily held in said cutting position to dam the flow of said brine solution.

* * * * *